(12) United States Patent
Tsai et al.

(10) Patent No.: US 7,825,898 B2
(45) Date of Patent: *Nov. 2, 2010

(54) INERTIAL SENSING INPUT APPARATUS

(75) Inventors: Ming-Jye Tsai, Zhubei (TW);
Shun-Nan Liou, Kaohsiung (TW);
Ren-Yuan Yu, Hsinchu (TW); Chin-Lin Hsieh, Banqiao (TW); Shyang-Jye Chang, Xindian (TW); Hsiang-Yu Huang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 331 days.

This patent is subject to a terminal disclaimer.

(21) Appl. No.: 11/304,744

(22) Filed: Dec. 16, 2005

(65) Prior Publication Data

US 2006/0256077 A1 Nov. 16, 2006

Related U.S. Application Data

(63) Continuation-in-part of application No. 11/189,861, filed on Jul. 27, 2005.

(30) Foreign Application Priority Data

May 13, 2005 (TW) ............................... 94115697 A
Sep. 16, 2005 (TW) ............................... 94131979 A (51) Int. Cl.
*G09G 5/08* (2006.01)
(52) U.S. Cl. ...................................... 345/158; 345/157
(58) Field of Classification Search ................. 345/156, 345/158, 163–166
See application file for complete search history.

(56) References Cited

U.S. PATENT DOCUMENTS 4,787,051 A * 11/1988 Olson ........................ 345/179
5,128,671 A * 7/1992 Thomas, Jr. ................. 341/20

(Continued)

FOREIGN PATENT DOCUMENTS

CN 2005 I 0105568.0 5/2008

(Continued)

OTHER PUBLICATIONS

Industrial Technology Research Institute, "Technology Transfer and License Agreement" May 26, 2010, Taiwan.

(Continued)

*Primary Examiner*—Alexander Eisen
*Assistant Examiner*—Stuart McCommas
(74) *Attorney, Agent, or Firm*—WPAT, PC; Justin King (57) ABSTRACT

An inertial sensing input apparatus is disclosed in the invention, comprising: a housing; a first inertial part, coupled to a circuit substrate received in the housing, for detecting a motion measured with respect to a second axis and a third axis of a space and also for detecting a motion measured along a first axis of a plane; a second inertial part, coupled to the circuit substrate, for detecting a motion measured with respect to a first axis of the space and also for optionally detecting a motion measured along a second axis of the plane; and a micro-controller, coupled to the circuit substrate, capable of converting electrical signals received from the first and the second inertial parts into a displacement signal while transmitting the displacement signal to an electronic display device by a means of transmission.

14 Claims, 6 Drawing Sheets

U.S. PATENT DOCUMENTS

| | | | |
|---|---|---|---|
| 5,506,605 A * | 4/1996 | Paley | 345/163 |
| 5,781,172 A | 7/1998 | Engel et al. | 345/164 |
| 5,874,941 A * | 2/1999 | Yamada | 345/157 |
| 6,342,878 B1 * | 1/2002 | Chevassus et al. | 345/158 |
| 2002/0089489 A1 * | 7/2002 | Carpenter | 345/158 |
| 2004/0104891 A1 | 6/2004 | Sacca et al. | 345/156 |

FOREIGN PATENT DOCUMENTS

| | | |
|---|---|---|
| JP | 4061322 | 12/2007 |
| KR | 10 0739980 | 7/2007 |
| TW | 494350 | 7/2002 |
| TW | 547220 | 8/2003 |
| TW | 594563 | 6/2004 |

OTHER PUBLICATIONS

CyWee Group Limited, "Cywee commercial catalog", Taiwan.

* cited by examiner

INERTIAL SENSING INPUT APPARATUS

RELATED APPLICATION

This application is a continuation-in-part of U.S. Ser. No. 11/189,861, filed on Jul. 27, 2005, entitled "Inertial Mouse" and currently pending.

FIELD OF THE INVENTION

The present invention relates to a band-held input device for computers, and more particularly, to an inertial sensing input apparatus capable of sensing and measuring the variation of acceleration while employing the results of the sensing/measuring as the detection of an inertial of the movement of a hand holding the inertial sensing input apparatus and as the measurement of the rotation or translation of movement.

BACKGROUND OF THE INVENTION

Currently, there are many kinds of computer mouse available on the market, which are the most popular human-machine interface used by computers as cursor-control device. There are three basic types of mice, which are mechanical mouse, LED optical mouse and laser mouse with respect to the different means of detection. A typical mechanical mouse comprises a chassis containing a ball, with a part of the ball protruding through the underside of the chassis. When an user moves the mouse about on a flat surface, the ball rotates which is detected by the sensors arranged in the chassis. Unfortunately the moving parts of such a mouse can become dirty, causing the sensors to incorrectly measure ball rotation. A typical LED optical mouse has a small, red light-emitting diode (LED) that bounces light off that surface with sufficient roughness onto a complimentary metal-oxide semiconductor (CMOS) sensor. The CMOS sensor sends each image to a digital signal processor (DSP) for analysis, that the DSP is able to detect patterns of shadows generated by the roughness of the surface in the images and see how those patterns have moved since the previous image. Based on the change in patterns over a sequence of images, the DSP determines how far the mouse has moved and sends the corresponding coordinates to the computer. However, if the working surface of the LED optical mouse is a smooth surface made of marble, tile, or metal, etc., such mouse might not be able to operate without a hitch. A laser mouse is an advanced optical mouse, which is capable of emitting a coherent light so as to detect more surface pattern variation than the standard LED based optical mice. Nevertheless, such laser mice are not able to operate fluently while working on a transparent surface made of glass, acrylic, and so on.

In 1995, an input device is disclosed in U.S. Pat. No. 5,898,421, entitled "Gyroscopic Pointer and Method", by Gyration Inc., which is a hand-held input device having an inertial gyroscopic element arranged therein, capable of being used either in free space, employing the inertial gyroscopic element for detecting angular velocity of a user's hand and thus defining movements of a cursor displayed on a screen of an interactive computer, or while sitting on a surface, employing either an optical element or moving part for detecting movement of a user's hand. An inertial mouse generated by the Gyration Inc. with respect to the referring patent is already available on the market, which is acting as a common LED optical mouse while it is sitting on a surface, and is acting as an inertial mouse using the inertial gyroscopic element to detect the angular velocity of rotation while it is operating in free space. Since the aforesaid mouse can be considered as a standard LED optical mouse with addition gyroscope arranged therein, it is conceivable that the cost of the referring mouse is comparably higher. Moreover, the pricey gyroscope further restricts the popularity of the inertial mouse, that is, the average price of a high-end mouse currently available on the market is about US$ 40.00 while a one-axis gyroscope will already cost about US$ 30.00. By virtue of this, the price of the "Gyration In-Air Wireless Optical Mouse" produced by the Gyration Inc. is about US$ 79.00, which is less competitive comparing to the optical mice, both in cost and in price.

In general, the drawbacks of this computer mouse with inertial gyroscopic element can be summing up as following:
 (1) Since the aforesaid mouse is implementing optical sensors for detecting how far the mouse moved while operating on a flat surface, it will still has problems of power consumption and tracing capability similar to the typical optical mouse.
 (2) Since the aforesaid mouse uses a gyroscope for detecting angular velocity of the mouse while operating in a free space, the use of the pricey gyroscope will cause the cost of the mouse to increase and thus the price of the mouse is too high to be competitive.

For a conventional laser pointer, it can only be used to aim at specific images in a briefing operation. Therefore, one might like to have a tool with functions of a laser point and an inertial mouse capable of sensing and measuring the movement thereof, so that the aforesaid tool can be used in a briefing operation for controlling operations consist of file loading, jumping to next page, jumping to last page or entering index mode, and so on, while pointing to an image of interested.

Therefore, what is needed and would be useful is an inertial mouse capable of operating functional while sitting on a flat surface and in a free space, which is convenient to use and has high precision in movement detection.

SUMMARY OF THE INVENTION

In view of the disadvantages of prior art, the primary object of the present invention is to provide an inertial sensing input apparatus, which has a plurality of inertial parts arranged therein in a specific disposition such that the movements of the inertial sensing input apparatus can be obtained no matter it is moving on a surface or in a free space and thus the movements of a cursor displayed on a screen of an interactive computer corresponding to the inertial sensing input apparatus can be determined by a differential operation.

It is another object of the invention to provide an inertial sensing input apparatus, which has a mode switch for controlling the switching of the sensing capabilities of the inertial sensing input apparatus, that is, the inertial sensing input apparatus is selected to be in a mode of two-dimensional detection or in a mode of three-dimensional detection by the control of the mode switch.

It is further another object of the invention to provide an inertial sensing input apparatus having a return switch, by which the plural inertial parts are controlled to activated/deactivated while the inertial sensing input apparatus in operating in the two-dimensional detection mode for preventing the inertial parts to detect uncalled for movements of the inertial sensing input apparatus.

To achieve the above objects, the present invention provide an inertial sensing input apparatus, comprising: a housing; a first inertial part, coupled to a circuit substrate received in the housing, for detecting a motion measured with respect to a second axis and a third axis of a space and also for detecting a motion measured along a first axis of a plane; a second inertial part, coupled to the circuit substrate, for detecting a motion measured with respect to a first axis of the space and also for optionally detecting a motion measured along a second axis of the plane; and a micro-controller, coupled to the circuit substrate, capable of converting electrical signals received from the first and the second inertial parts into a displacement/rotation signal while transmitting the displacement signal to an electronic display device by a means of transmission.

In a preferred embodiment of the invention, the first inertial part further comprises: a first accelerometer, coupled to the micro-controller, for detecting the acceleration measured along the first axis of the plane and the acceleration measured along the first axis of the space; and an auxiliary accelerometer, coupled to the micro-controller while being positioned apart from the first accelerometer by a distance, for detecting the acceleration measured along the first axis of the space; wherein the micro-controller receives and processes the accelerations from the first accelerometer and the auxiliary accelerometer by a differential operation so as to acquire an angular movement corresponding to the third axis of the space. In addition, the first accelerometer is capable of detecting the rotation measured along the second axis of the space.

In another preferred embodiment of the invention, the second inertial part further comprises a second accelerometer, coupled to the micro-controller, for detecting the acceleration measured along the second axis of the plane and the rotation measured along the first axis of the space.

Preferably, the inertial sensing input apparatus further comprises a mode switch, coupled to the circuit substrate, for controlling the micro-controller to perform an operation selected from the group consisting of a calculation of two-dimensional displacement and a calculation of three-dimensional displacement.

Moreover, the inertial sensing input apparatus further comprises a return switch, coupled to the circuit substrate, for controlling the micro-controller to proceed with a process selected from the group consisting of stopping the calculation of two-dimensional displacement and proceeding with the calculation of two-dimensional displacement, while the micro-controller is controlled to perform the calculation of two-dimensional displacement.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1A:
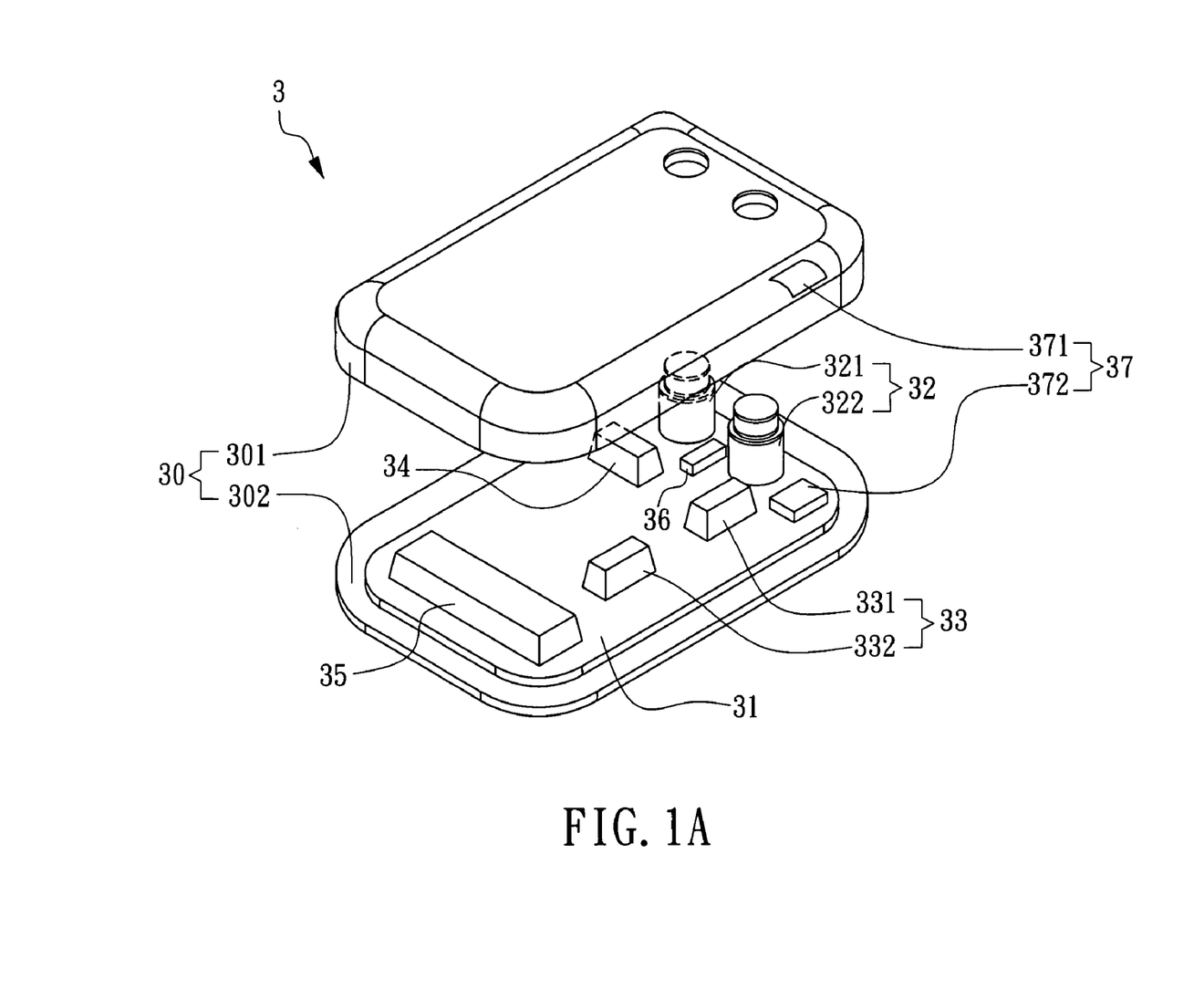
FIG. 1A is a schematic view showing the assembly of an inertial sensing input apparatus according to a preferred embodiment of the invention.

Please refer to FIG. 1A, which is a schematic view showing the assembly of an inertial sensing input apparatus according to a preferred embodiment of the invention. As seen in FIG. 1 A, the inertial sensing input apparatus 3 of the invention comprises: a housing 30, composed of top casing 301 and a bottom casing 302; a circuit substrate 31, received in the housing 30; a key set 32; a first inertial part 33; a second inertial part 34; a micro-controller 35; a wireless transmission module 36; a mode switch 37; and a return switch 38 (not shown in the figure).

The first inertial part 33, being coupled to a circuit substrate 35, is used for detecting a motion measured with respect to a second axis and a third axis of a space and also for detecting a motion measured along a first axis of a plane. In a preferred embodiment of the invention, the first inertial part 33 further comprises: a first accelerometer 331, coupled to the micro-controller 35, for detecting the acceleration measured along the first axis of the plane and the acceleration measured along the first axis of the space; and an auxiliary accelerometer 332, coupled to the micro-controller 35 while being positioned apart from the first accelerometer 331 by a distance, for detecting the acceleration measured along the first axis of the space.

The second inertial part 34, being coupled to the circuit substrate 35, is used for detecting a motion measured with respect to a first axis of the space and also for detecting a motion measured along a second axis of the plane. In the aforesaid preferred embodiment of the invention, the second inertial part 34 further comprises; a second accelerometer, coupled to the micro-controller 35, for detecting the acceleration measured along the second axis of the plane and the rotation measured along the first axis of the space.

The key set 32 including a left button 321 and a right button 322, which are used as input interfaces. The micro-controller 35, being coupled to the circuit substrate 31, is capable of converting electrical signals received from the first and the second inertial parts 33, 34 into a displacement signal while transmitting the displacement signal to an electronic display device by a means of transmission. In the aforesaid preferred embodiment of the invention, the electronic display device can be a television set, a multimedia device, or a computer and the like. In addition, the means of transmission includes a wired transmission method and a wireless transmission method.

The mode switch 37, comprising a switch control 372 coupled to the circuit substrate 31, and a control button 371 electrically connected to the switch control 372, is used for controlling the micro-controller 35 to perform an operation selected from the group consisting of a calculation of two-dimensional displacement and a calculation of three-dimensional displacement, that is, the inertial sensing input apparatus 3 can be controlled and selected to be in a mode of two-dimensional detection or in a mode of three-dimensional detection by the switch of the mode switch 37. By virtue of this, when the mode switch 37 controls the micro-controller 35 to perform the calculation of two-dimensional displacement, i.e. the inertial sensing input apparatus 3 is in the two-dimension detection mode, the first inertial part 33 is used for detecting a motion measured along the first axis of the plane, and the second inertial part 34 is used for detecting a motion measured along the second axis of the plane, being orientated orthogonal to the first axis; and when the mode switch 37 controls the micro-controller 35 to perform the calculation of three-dimensional displacement, i.e. the inertial sensing input apparatus 3 is in the three-dimension detection mode, the first inertial part 33 is used for detecting the rotations measured along the second and the third axis of the space, and the second inertial part 34 is used for detecting the rotation measured along the first axis of the space.

Figure 1B:
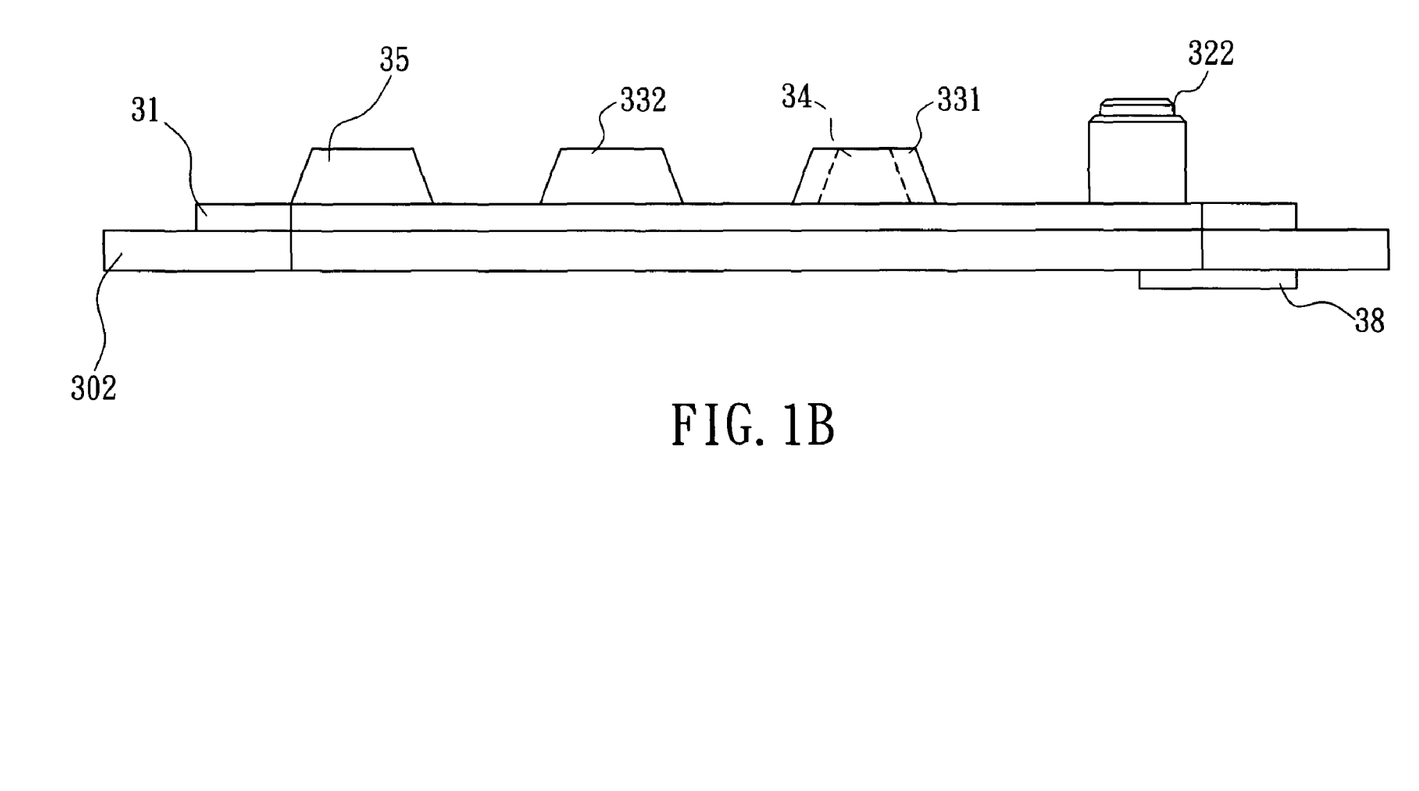
FIG. 1B is a side view of an inertial sensing input apparatus of the invention.

Please refer to FIG. 1B, which is a side view of an inertial sensing input apparatus of the invention. In FIG. 1B, the inertial sensing input apparatus 3 further comprising a return switch 38, which is arranged at the bottom of the bottom casing 302 while electrically connected to the circuit substrate 31, and is used for controlling the micro-controller 35 to proceed with a process selected from the group consisting of stopping the calculation of two-dimensional displacement and proceeding with the calculation of two-dimensional displacement, while the inertial sensing input apparatus 3 is in the two-dimension detection mode. That is, the return switch 38 disposed at the bottom of the inertial sensing input apparatus 3 is blocked from ejection when the mouse 3 is sitting on a surface and is in the two-dimension detection mode, such that the blocked return switch 38 enables the micro-controller 35 to proceed with the calculation of two-dimensional displacement. However, it is common for a user to lift the inertial sensing input apparatus 3 from the surface and place the inertial sensing input apparatus 3 to another position on the surface which is convenient for the next operation. Under the circumstance, in order to prevent the first and the second inertial parts 33, 34 to detect any uncalled for movement of he inertial sensing input apparatus 3 when it is being lifted in the air, the return switch 38 is ejected since it is not block by the surface so that the micro-controller 35 is controlled to proceed with a process of stopping the calculation of two-dimensional displacement. Therefore, a cursor displayed on a screen of an interactive computer can remain stationary when the inertial sensing input apparatus 3 is being lifted in the air.

Figure 2:
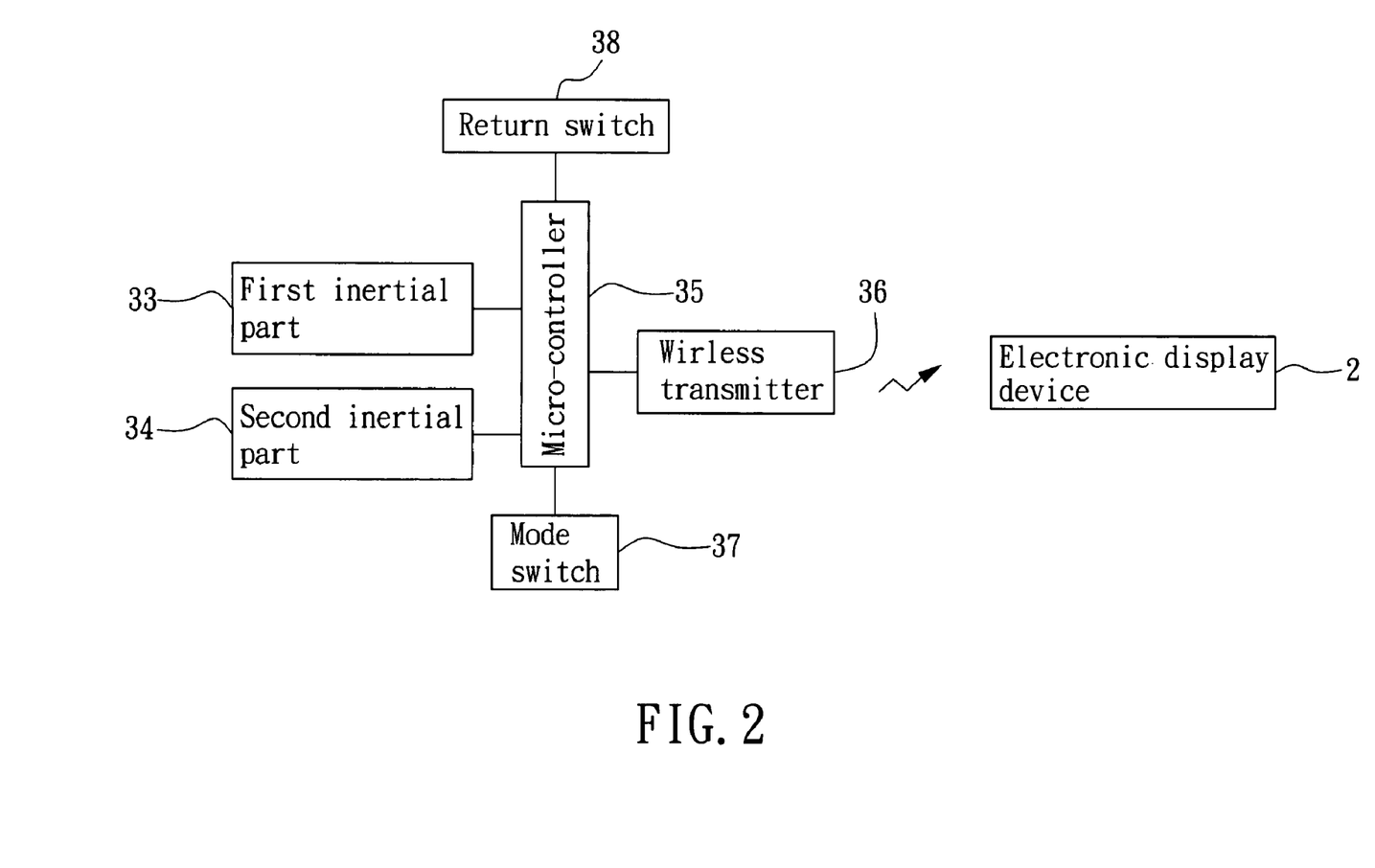
FIG. 2 is a block diagram showing an inertial sensing input apparatus according to a preferred embodiment of the invention.
Figure 3:
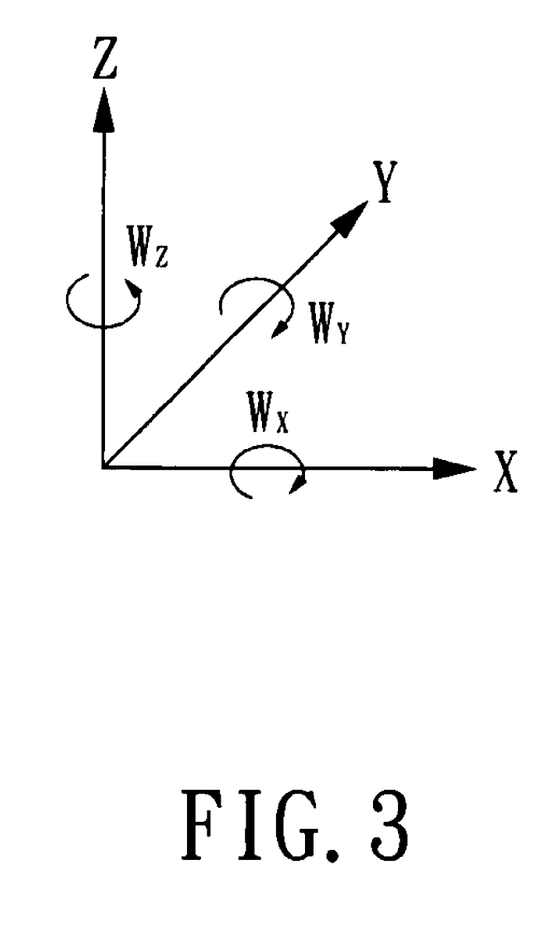
FIG. 3 is a 3-D Cartesian coordinates defining three angular velocities respectively for each coordinate, i.e. Wx, Wy, and Wz.

Please refer to FIG. 2 and FIG. 3, which respectively is a block diagram showing an inertial sensing input apparatus 3 and is a 3-D Cartesian coordinates of X, Y, Z axes defining three angular velocities, i.e. Wx, Wy, and Wz. When the inertial sensing input apparatus 3 is in the two-dimension detection mode controller by the mode switch 37, the first accelerometer 331 of the first inertial part 33 can detect the acceleration of the inertial sensing input apparatus 3 measured along the first axis of the plane, i.e. the X axis, and the second accelerometer of the second inertial part 34 can detect the acceleration of the inertial sensing input apparatus 3 measured along the second axis of the plane, i.e. the Y axis. Thereafter, the micro-controller 35 receives the signals of acceleration detected by the first and the second inertial parts 33, 34 and then processes the received signals by an integral operation so as to generate a displacement signal, that the displacement signal is further being transmitted to the electronic display device 2 by the wireless transmitter 16. Preferably, the electronic display device 2 can be a projection screen, a television, or a computer monitor, etc.

Referring to FIG. 3, when the inertial sensing input apparatus 3 is in the three-dimension detection mode controlled by the mode switch 37, the second inertial part 34 can detect the rotation of the inertial sensing input apparatus 3 measured along the first axis of the space, which is addressed as Wx of FIG. 3, while the micro-controller 35 receives and processes the detected acceleration variation so as to calculate a pitch angle employed as an input for controlling the cursor to move up/down the electronic display device 2, which is being transmitted to the electronic display device 2 by the wireless transmitter 16.

Figure 4:
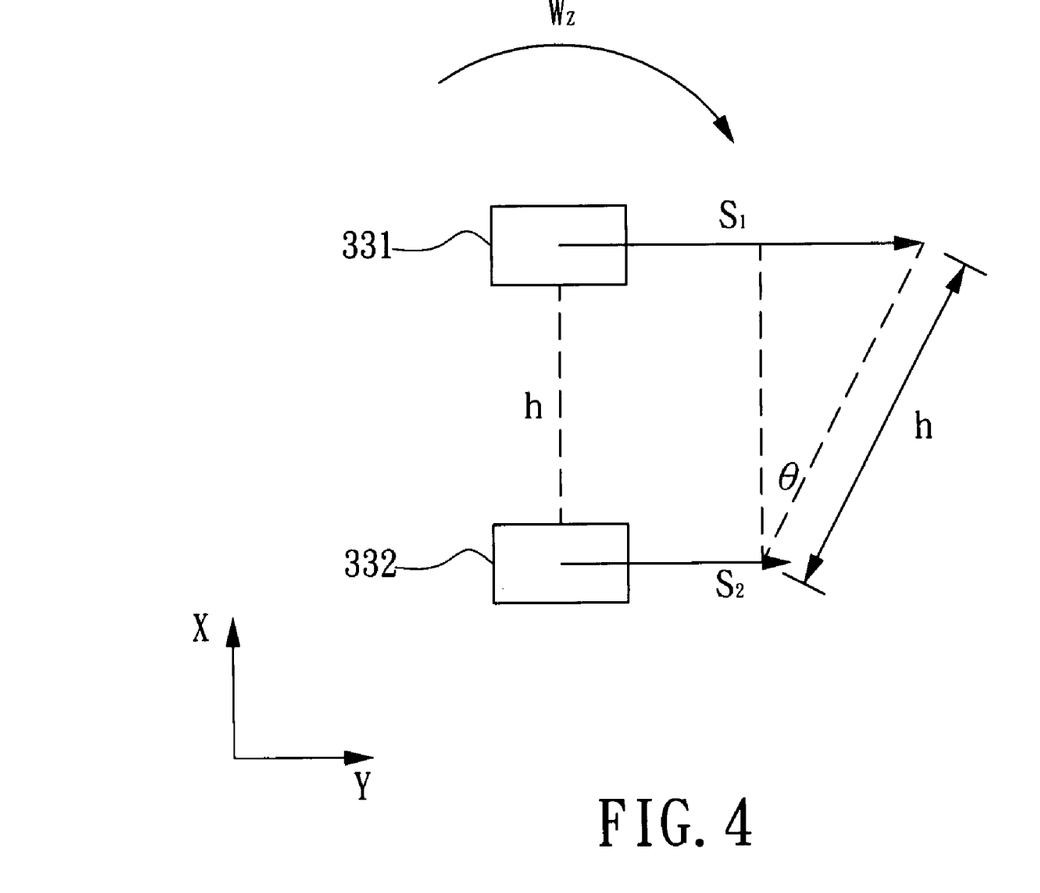
FIG. 4 is a schematic diagram showing the detection of angular movement measured along the third axis of the space according to a preferred embodiment of the invention.

Please refer to FIG. 4, which a schematic diagram showing the detection of angular movement measured along the third axis of the space according to a preferred embodiment of the invention. As seen in FIG. 4, By integrating the variations of acceleration measured along the X axis respectively by the first accelerometer 331 and the auxiliary accelerometer 332, the displacements $S_1$, $S_2$ can be acquired. According to the difference between the displacements $S_1$, $S_2$ and the distance h between the first accelerometer 331 and the auxiliary accelerometer 332, the angular variation θ measured corresponding to the Z axis can be acquired, which is used as input for controlling the cursor to move left/right the electronic display device 2 and is being transmitted to the electronic display device 2 by the wireless transmitter 16.

In FIG. 3, the first accelerometer 331 of the first inertial part 33 also can be used for detecting the rotation Wy measured along the second axis (i.e. the Y axis of FIG. 3) of the space while the detection being further transmitted to the micro-controller 35 to be processed so as to acquire an angular variation, which is being employed as input for controlling the cursor and is being transmitted to the electronic display device 2 by the wireless transmitter 16.

Figure 5:
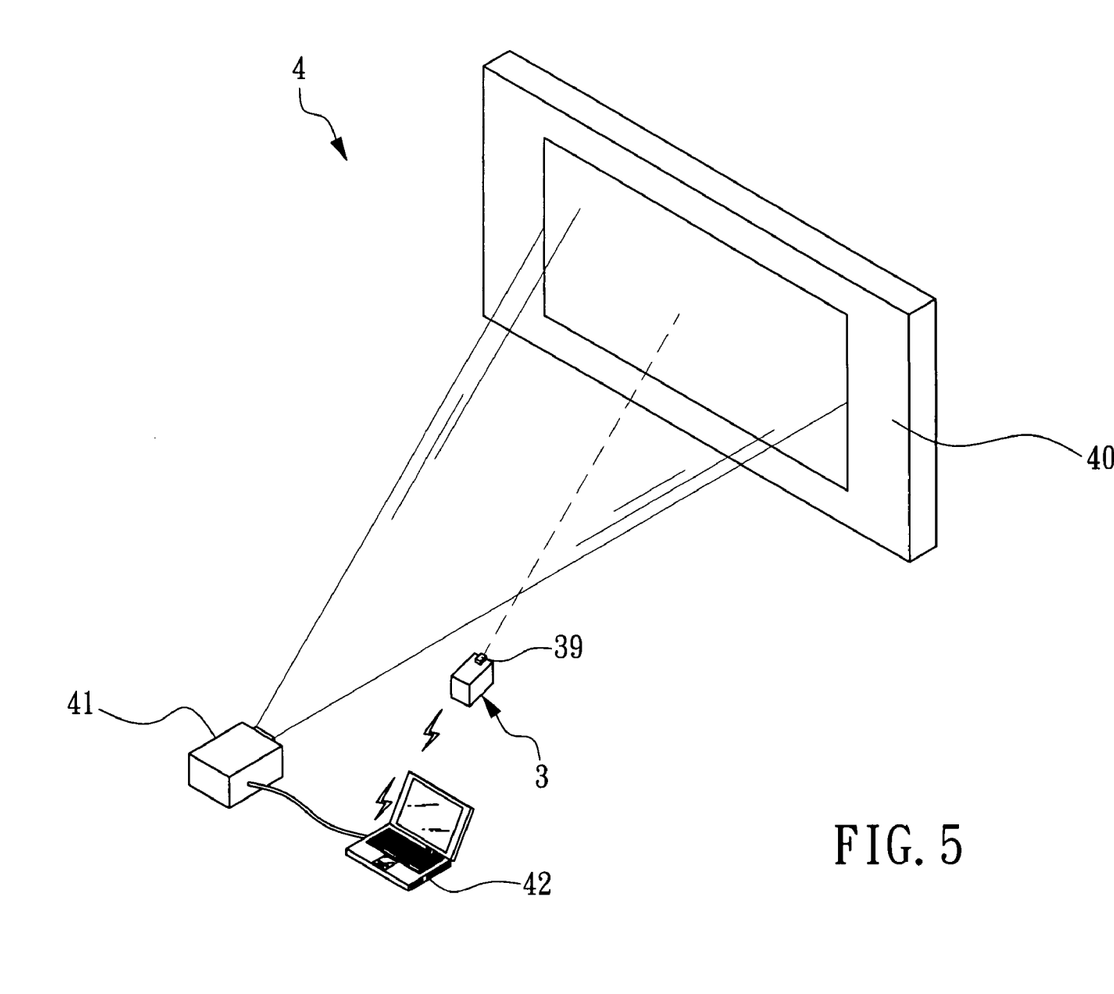
FIG. 5 is a schematic diagram depicting the application of an inertial sensing input apparatus of the invention in a briefing system.

It is noted that the inertial sensing input apparatus of the invention can be applied in the design of computer mouse, by which the mouse is enabled to perform a detection of two-dimensional displacement and a calculation of three-dimensional displacement. Please refer to FIG. 5, which is a schematic diagram depicting the application of an inertial sensing input apparatus of the invention in a briefing system. As seen in FIG. 5, the briefing system 4, includes a projection screen 40, a projector 41 and a computer 42 employing an inertial sensing input apparatus 3 as input device thereof. As the inertial sensing input apparatus 3 is in the mode of three-dimensional detection, the inertial sensing input apparatus 3 can be employed as a pointer for a briefing operation, whereas the speaker of the briefing can hold the inertial sensing input apparatus 3 in his/her hand and use the same to control the movement of the cruiser projected on the projection screen 40 by the computer 42. Moreover, the inertial sensing input apparatus 3 further comprises a laser pointer 39 attached thereon, which can be used for projecting a laser dot on the projection screen 40.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An inertial sensing input apparatus, comprising:
a housing;
a mode switch, for controlling the inertial sensing input apparatus to operate in a mode of two dimensional displacement detection calculating two dimensional displacement information, or a mode of three dimensional displacement detection calculating three dimensional displacement information;
a return switch, for activating and deactivating calculation of two-dimensional displacement;

a micro-controller, for converting received electrical acceleration sensor signals into corresponding displacement signals to be transmitted to an electronic display device to effect control of a cursor on said electronic display device;

a first accelerometer, coupled to said micro-controller, for measuring a first linear acceleration of the inertial sensing input apparatus along a first axis when the inertial sensing input apparatus is operating in a mode of two-dimensional displacement detection, and for measuring rotational acceleration around a second axis orthogonal to said first axis when the inertial sensing input apparatus is operating in a mode of three-dimensional displacement detection;

an auxiliary accelerometer, coupled to said micro-controller, for measuring an additional linear acceleration of the inertial sensing input apparatus along the first axis; and, a second accelerometer, coupled to said micro-controller, for measuring a second linear acceleration of the inertial sensing input apparatus along a second axis when the inertial sensing input apparatus is operating in a mode of two-dimensional displacement detection, and for measuring rotational acceleration around the first axis when the inertial sensing input apparatus is operating in a mode of three-dimensional displacement detection;

wherein the micro-controller receives a signal from the first accelerometer indicating the first linear acceleration of the inertial sensing input apparatus along the first axis, and determines the displacement of the first accelerometer, wherein the micro-controller receives a signal from the auxiliary accelerometer indicating the additional linear acceleration of the inertial sensing input apparatus along the first axis, and determines the displacement of the auxiliary accelerometer, wherein the micro-controller calculates the difference between the displacement of the first accelerometer and the displacement of the auxiliary accelerometer, and uses the calculated distance between the first accelerometer and the auxiliary accelerometer to determine an angular variation signal relating to the rotation of the inertial sensing input apparatus around a third axis being orthogonal to said first axis and said second axis.

2. The inertial sensing input apparatus of claim 1, wherein the first accelerometer detects rotational movement around the second axis for calculating said three dimensional displacement information.

3. The inertial sensing input apparatus of claim 1, said micro-controller transmits a wired signal to an electronic display device.

4. The inertial sensing input apparatus of claim 1, said micro-controller transmits a wireless signal to an electronic display device.

5. The inertial sensing input apparatus of claim 1, wherein the first accelerometer detects rotational movement around the second axis for calculating said two-dimensional displacement information.

6. The inertial sensing input apparatus of claim 1, wherein the second accelerometer detects linear movement along the second axis when said return switch controls said micro controller to calculate said two-dimensional displacement information.

7. The inertial sensing input apparatus of claim 1, wherein the first accelerometer and said auxiliary accelerometer detect rotational movement around the third axis when said return switch controls said micro controller to calculate the three-dimensional displacement information.

8. The inertial sensing input apparatus of claim 1, wherein the second accelerometer detects said rotational movement around the first axis when said return switch controls said micro controller to calculate said three-dimensional displacement information.

9. The inertial sensing input apparatus of claim 1, wherein the auxiliary accelerometer detects rotational movement around the third axis when said return switch controls said micro controller to calculate said three-dimensional displacement information.

10. The inertial sensing input apparatus of claim 1, wherein the return switch further comprising comprises:

a switch control, coupled to the micro-controller; and a control button, electrically connected to the switch control.

11. The inertial sensing input apparatus of claim 1, wherein the return switch is arranged at the bottom of the housing while electrically connected to the circuit substrate.

12. The inertial sensing input apparatus of claim 1, wherein the inertial sensing input apparatus is a computer mouse.

13. The inertial sensing input apparatus of claim 1, wherein the inertial sensing input apparatus is used as a pointer for a briefing operation, being held on the hand of the speaker of the briefing for enabling the speaker to control a computer cruiser thereby.

14. The inertial sensing input apparatus of claim 1, wherein the inertial sensing input apparatus further comprises a laser pointer.

* * * * *